(No Model.)

W. R. BOERNER.
BIRD CAGE PERCH.

No. 251,168. Patented Dec. 20, 1881.

Witnesses:
J. H. Shumway
L. D. Rogers

Wunibald R. Boerner
Inventor
By Atty.

UNITED STATES PATENT OFFICE.

WUNIBALD R. BOERNER, OF CHICAGO, ILLINOIS, ASSIGNOR TO A. B. HENDRYX & CO., OF NEW HAVEN, CONNECTICUT.

BIRD-CAGE PERCH.

SPECIFICATION forming part of Letters Patent No. 251,168, dated December 20, 1881.

Application filed October 21, 1881. (No model.)

*To all whom it may concern:*

Be it known that I, WUNIBALD R. BOERNER, of Chicago, in the State of Illinois, have invented a new Improvement in Perches for Bird-Cages; and I do hereby declare the following, when taken in connection with the accompanying drawings and the letters of reference marked thereon, to be a full, clear, and exact description of the same, and which said drawings constitute part of this specification, and represent, in—

Figure 1:
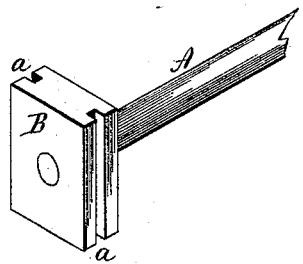
Figure 2:
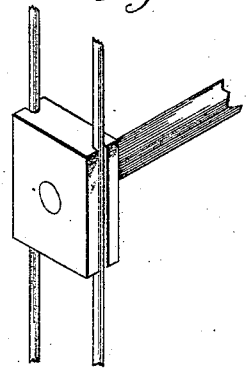
Figure 3:
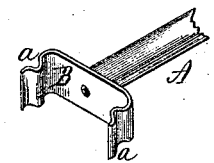
Figure 4:
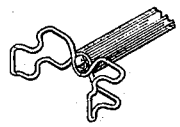

Figure 1, a perspective view of one end of the perch; Fig. 2, a perspective view, showing the application of the perch to the cage; Figs. 3 and 4, modifications.

This invention relates to an improvement in the means for securing perches to bird-cages. Usually the perches are introduced and supported by a transverse rest secured to the wires, and not therefore adjustable to different elevations.

The object of this invention is to construct a perch which may be introduced at any point in the cage and also adjusted to any desired elevation between the wires; and it consists in constructing the end of the perch with a frictional bearing, which, when introduced between the vertical wires of the cage, will hold the perch at any elevation simply by the friction produced between the device on the end of the perch and the wires of the cage.

A represents the perch, the shape and length of which are adapted to the class of cage for which the perch is desired. On the end of the perch a block or cross-head of wood, B, is firmly attached, the plane of which is at right angles to the axis of the perch. It should be a little broader than the width between the wires, and in its two edges a groove, *a*, is made, which will pass onto or embrace the wires of the cage, so that the block may be introduced between any two wires by simply springing the wires apart until the block will enter, and when the grooves are in line with the wires the reaction of the wires will bring them into the grooves, so as to closely embrace the block, and so that the friction will be sufficient to hold the perch at any point of elevation between the two wires.

In case of perches which extend entirely across the cage a like cross-head will be attached to each end of the perch, so as to make a support at both ends, but in short perches the cross-head at one end will give all the support necessary, because of the hold which it takes upon the wires, as seen in Fig. 2.

Instead of making the cross-head or frictional device of wood, it may be made of a strip of sheet metal, as seen in Fig. 3, attached directly to the end of the perch and extending to the right and left, its two ends turned outward to form the frictional grooves *a*, substantially the same as in the wood cross-head; or it may be made from wire, as seen in Fig. 4, attached to the end of the perch, and so as to form the grooves *a*, which will engage the wires and hold the perch by frictional contact therewith. After the perch has been once set in position between the wires it may be readily moved up or down on the wires as guides, the friction securely holding the perch at any point to which it may be so moved.

I am aware that it is common to secure articles of bird-cage furniture between wires by frictional contact of said wires with some part of such articles. I therefore do not broadly claim such a device.

I claim—

The herein-described perch for bird-cages, consisting of the perch-bar, combined with the cross head B at one or both ends in a plane at right angles to the axis of the perch, the said cross-head constructed with vertical grooves upon its opposite sides to engage the wires of the cage, substantially as described.

WUNIBALD R. BOERNER.

Witnesses:
JOHN BECKER,
PAUL KÖNIG.